United States Patent
Loftus, Jr. et al.

(10) Patent No.: US 9,150,980 B2
(45) Date of Patent: Oct. 6, 2015

(54) METHOD OF REMOVING A METAL DETAIL FROM A SUBSTRATE

(71) Applicant: The Boeing Company, Chicago, IL (US)

(72) Inventors: Robert T. Loftus, Jr., Gilbert, AZ (US); Robert L. Knicely, Mesa, AZ (US); Nicklaus C. Kimball, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 161 days.

(21) Appl. No.: 13/962,296

(22) Filed: Aug. 8, 2013

(65) Prior Publication Data

US 2015/0041330 A1   Feb. 12, 2015

(51) Int. Cl.
*C25F 3/02* (2006.01)
*C25F 3/14* (2006.01)
*C25F 5/00* (2006.01)
*B64C 11/20* (2006.01)
*B64C 27/473* (2006.01)

(52) U.S. Cl.
CPC ............. *C25F 3/02* (2013.01); *B64C 11/205* (2013.01); *C25F 3/14* (2013.01); *C25F 5/00* (2013.01); *B64C 2027/4736* (2013.01)

(58) Field of Classification Search
CPC ............. C25F 3/02; C25F 3/14; C25F 5/00
USPC .................................. 205/640, 641, 666
See application file for complete search history.

(56) References Cited

U.S. PATENT DOCUMENTS

| | | | |
|---|---|---|---|
| 4,482,445 A | | 11/1984 | Fjelstad |
| 4,761,210 A | * | 8/1988 | Ehrler et al. ............... 205/660 |
| 5,567,304 A | * | 10/1996 | Datta et al. ............... 205/666 |
| 2005/0179023 A1 | | 8/2005 | Daiku et al. |
| 2006/0207888 A1 | * | 9/2006 | Taylor et al. ............... 205/646 |
| 2009/0261068 A1 | * | 10/2009 | Kool et al. ............... 216/104 |
| 2012/0074209 A1 | | 3/2012 | Wu et al. |
| 2012/0135588 A1 | | 5/2012 | Huang et al. |

FOREIGN PATENT DOCUMENTS

| | | |
|---|---|---|
| CN | 1078506 C | 11/1993 |
| EP | 0854208 | 7/1998 |
| EP | 0854208 A1 | 7/1998 |
| EP | 1493901 A1 * | 1/2005 |
| EP | 2367970 | 9/2011 |

(Continued)

OTHER PUBLICATIONS

Allied Plating Supplies, Inc. "Micro XP-2000 Sealant" available at <http://www.alliedplating.com/store.asp?pid=18384>, last visited Aug. 6, 2103.

(Continued)

*Primary Examiner* — Nicholas A Smith

(57) ABSTRACT

A method of removing a metal detail from a dielectric material of an article may include placing the article in an electrolyte bath such that at least a portion of the metal detail is submerged. The metal detail may be coupled to a dielectric material. The method may further include positioning at least one cathode in the electrolyte bath in spaced relation to the metal detail, and passing electrical current through the metal detail. The method may additionally include deplating the metal detail from the dielectric material in response to passing the electrical current through the metal detail.

19 Claims, 13 Drawing Sheets

(56) References Cited

FOREIGN PATENT DOCUMENTS

| | | |
|---|---|---|
| JP | 2015034342 A | 2/2015 |
| SU | 1168634 A1 | 7/1985 |

OTHER PUBLICATIONS

AR15.com Forum, "Discussion regarding metal plating," available at <http://www.ar15.com/archive/topic.html?b=1&f=5&t=1165554>, last visited Aug. 6, 2103.

Wikipedia, "Electroplating," May 17, 2013.

Smith and Wesson Forum, "Discussion regarding removing chrome," available at <http://www.ar15.com/archive/topic.html?b=1&f=5&t=1165554>, last visited Aug. 6, 2103.

Globalspec Forum "Discussion regarding removal of Nickel from steel or bronze" available at <http://cr4.globalspec.com/thread/19533>, last visited Aug. 6, 2103.

Smokstak Forum "Discussion regarding removal of nickel plating" available at <http://www.smokstak.com/forum/showthread.php?t=61941>, last visited Aug. 6, 2103.

European Search Report for EP 14172429 dated Nov. 26, 2014.

European Search Report, Application No. 14172429.4, dated Mar. 11, 2015.

* cited by examiner

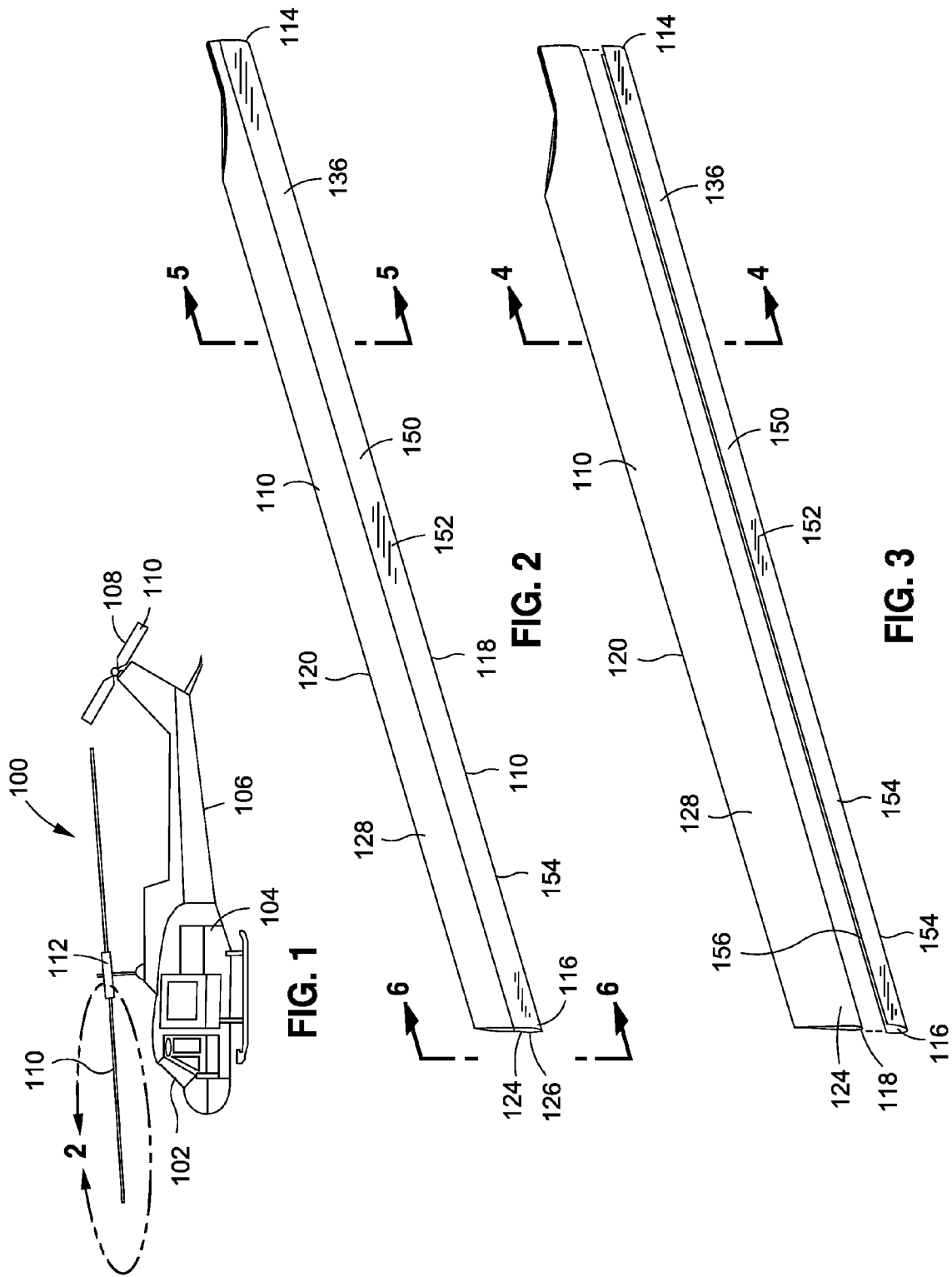

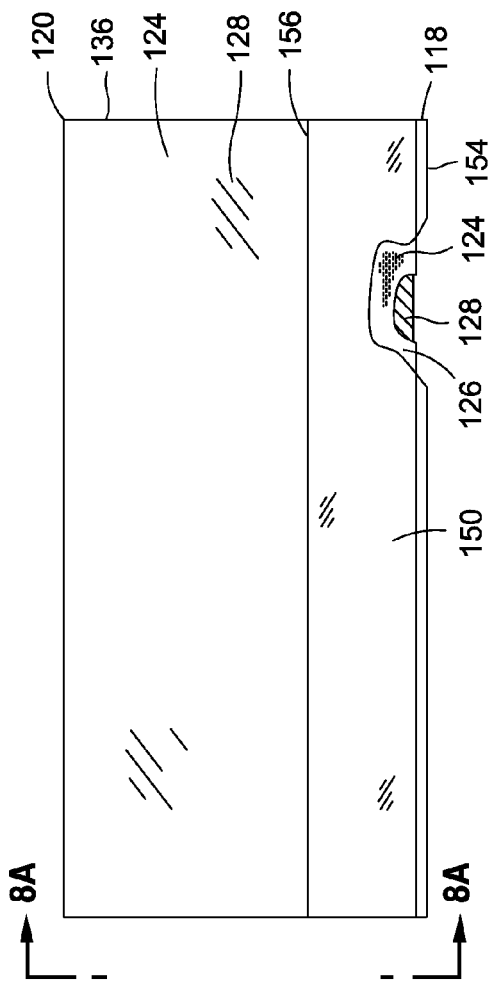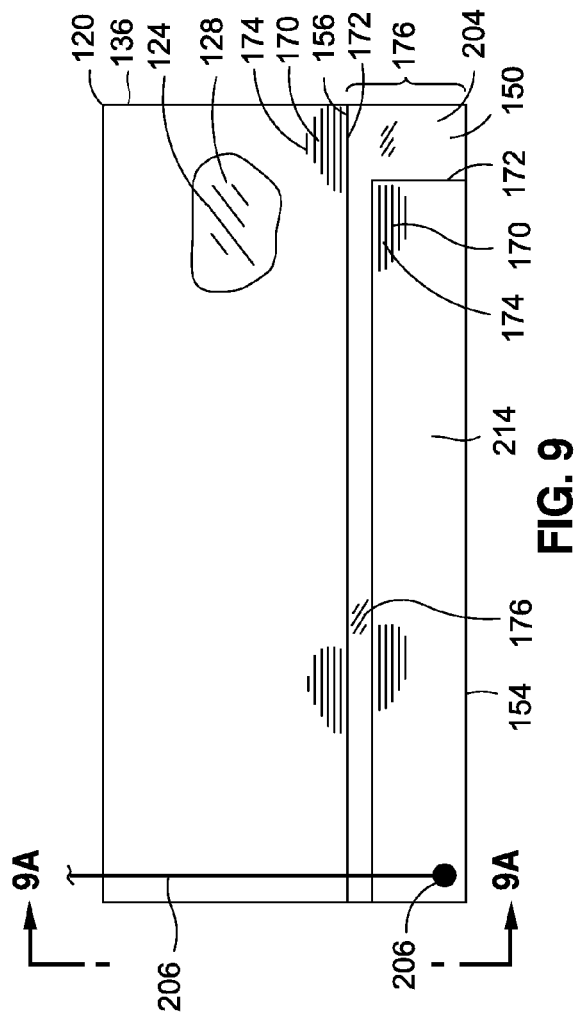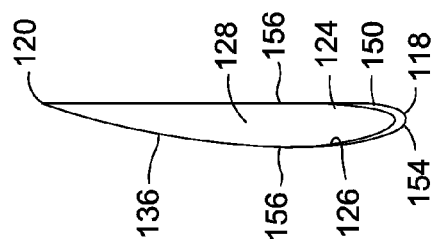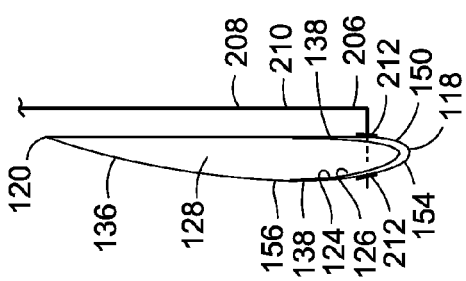

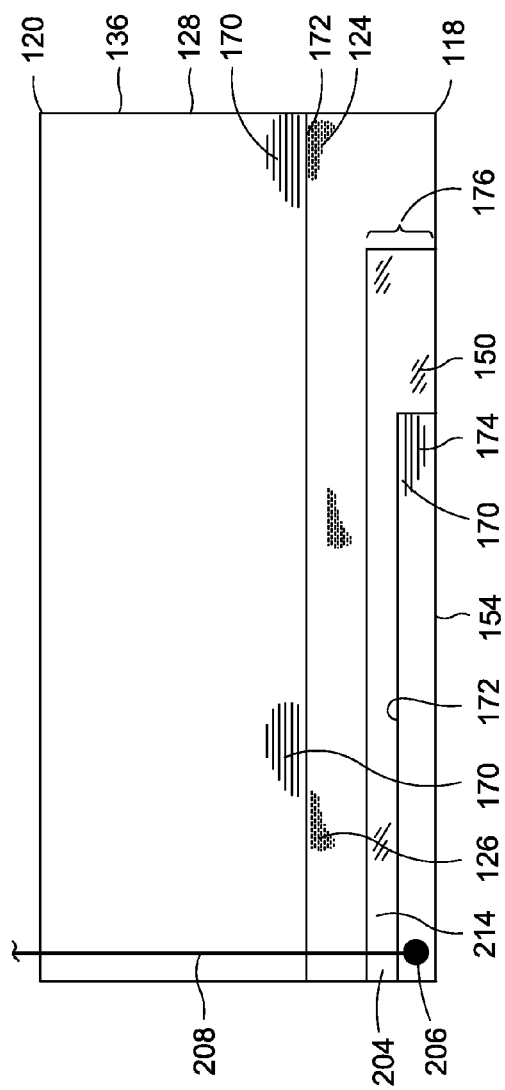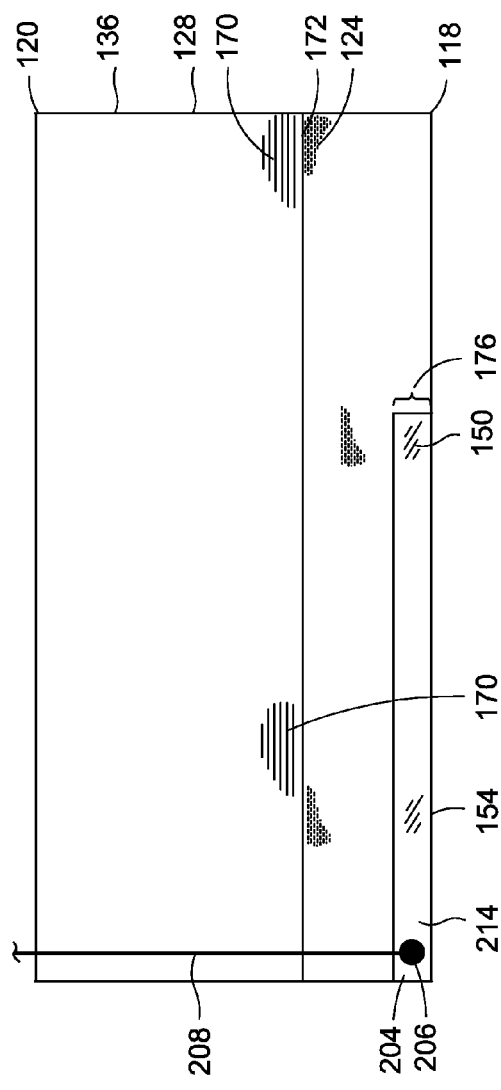

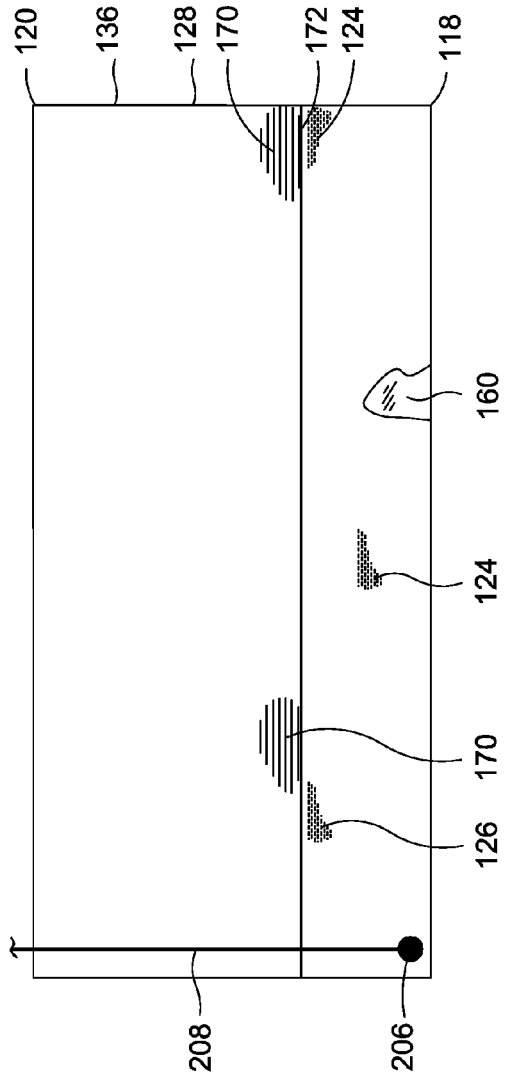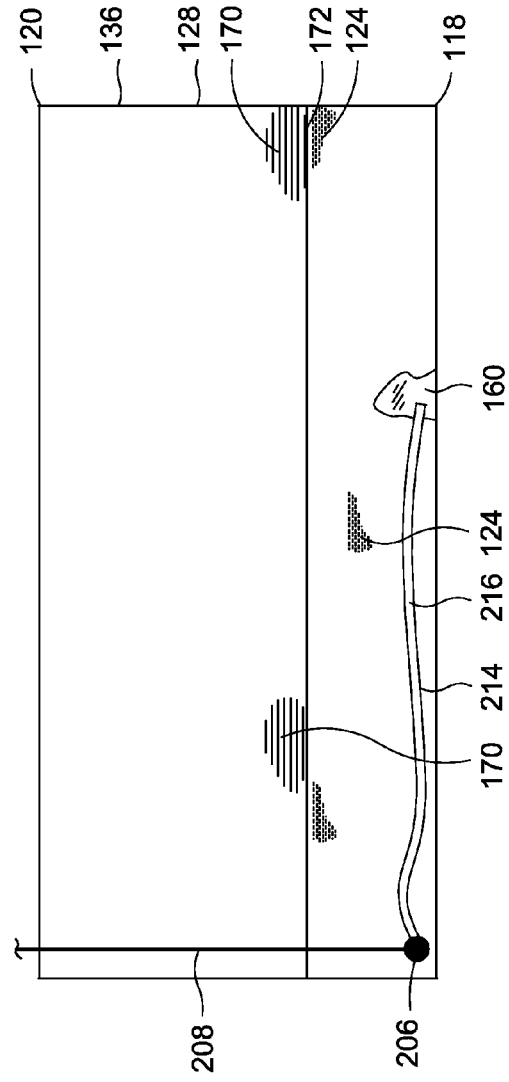

METHOD OF REMOVING A METAL DETAIL FROM A SUBSTRATE

FIELD

The present disclosure relates generally to the removal of metallic material from a substrate and, more particularly, to the removal of a metal detail from a dielectric material.

BACKGROUND

Many helicopter rotor blades and aircraft propellers include a sacrificial erosion strip mounted on a leading edge of the rotor blade or propeller. The erosion strip is typically formed as a metal detail comprised of nickel, titanium, stainless steel, and/or other metals. The metal detail is configured to protect the rotor blade or propeller from impact damage otherwise caused by rain, sand, dust, and other objects. Because the metal detail becomes worn over time, the metal detail must be periodically removed and replaced with a new metal detail.

For rotor blades and propellers constructed of metallic material, the metal detail may be mechanically fastened and/or adhesively bonded to the leading edge of the rotor blade or propeller. Replacement of a worn metal detail comprises removing the mechanical fasteners and installing a new metal detail on the metal rotor blade or propeller using the same or new mechanical fasteners. For metal details that are adhesively bonded to metal rotor blades or propellers, the metal detail may be removed using a cool-and-chip-away method wherein the rotor blade or propeller is chilled to weaken the adhesive bond. The metal detail may then be removed from the metal blade by chiseling the metal blade off of the metal rotor blade or propeller using a hammer and a chisel.

However, for rotor blades and propellers constructed of composite material such as fiber-reinforced graphite-epoxy material, the metal detail may be adhesively bonded to the composite rotor blade or propeller. Relatively new epoxy adhesive compounds may be stronger at low temperatures than the underlying composite material of the rotor blade or propeller. Due to the high strength of such new epoxy adhesive compounds, it may not be possible to use the cool-and-chip-away method for removing a metal detail from a composite rotor blade or propeller.

As can be seen, there exists a need in the art for a method of removing a metal detail from a rotor blade or propeller formed of composite material.

SUMMARY

The above-noted needs associated with removing a metal detail from a rotor blade or propeller are specifically addressed and alleviated by the present disclosure which provides a method of removing a metal detail from a dielectric material of an article. The method may include placing the article in an electrolyte bath such that at least a portion of the metal detail is submerged. The method may further include positioning at least one cathode in the electrolyte bath in spaced relation to the metal detail, and passing electrical current through the metal detail. The method may additionally include deplating the metal detail from the dielectric material in response to passing the electrical current through the metal detail.

In a further embodiment, disclosed is a method of removing a metal detail from a dielectric material of an article. The method may include the step of applying a masking layer to a portion of the metal detail to form a masked portion and an unmasked portion of the metal detail, wherein the unmasked portion may be exposed to an electrolyte bath. The article may be placed in the electrolyte bath such that at least a portion of the metal detail is submerged. The method may include positioning at least one cathode in the electrolyte bath in spaced relation to the metal detail, and passing electrical current through the metal detail. The method may further include deplating the unmasked portion in response to passing electrical current through the metal detail.

Also disclosed is a method of removing an erosion strip from a composite rotor blade or a propeller. The method may include placing the rotor blade or propeller in an electrolyte bath such that an erosion strip is at least partially submerged. The erosion strip may be formed of metallic material and may be coupled to the rotor blade or the propeller by a dielectric adhesive layer. The method may additionally include submersing a cathode in the electrolyte bath in spaced relation to the erosion strip, and applying an electrical current to the erosion strip. The method may also include deplating the erosion strip from the adhesive layer in response to applying the electrical current to the erosion strip.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 1 is a side view illustration of a helicopter having rotor blades;

FIG. 2 is a perspective illustration of a main rotor blade of the helicopter;

FIG. 3 is a partially exploded illustration of the main rotor blade of FIG. 2 and showing a metal detail that may be coupled to a leading edge of the main rotor blade;

FIG. 8 is a side view of an article representing a rotor blade and having a metal detail adhesively coupled to the substrate of the article using a dielectric material;

FIG. 8A is an end view of the article illustrating the attachment of the metal detail to a leading edge;

FIG. 9 is a side view of the article showing a masking layer applied to a portion of the metal detail to form a masked portion of the metal detail and an unmasked portion of the metal detail;

FIG. 9A is an end view of the article showing an anode conducting wire attached to the metal detail;

FIG. 16 is a side view of the article illustrating the further trimming of the masking portion to form a new unmasked portion of the metal detail for removal by the deplating process;

FIG. 17 is a side view of the article illustrating the remaining exposed portion of the metal detail for removal by the deplating process;

FIG. 18 is a side view of the article illustrating a metal island remaining on the dielectric material of the article;

FIG. 19 is a side view of the article illustrating a conductive strap connecting the metal island to the anode connection to allow for deplating of the metal island;

DETAILED DESCRIPTION

Figure 6:
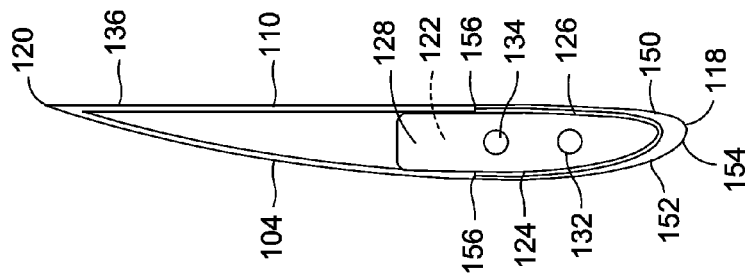
FIG. 6 is an end view of the main rotor blade showing the blade tip having one or more inserts installed thereon.

Referring now to the drawings wherein the showings are for purposes of illustrating various embodiments of the present disclosure, shown in FIG. 1 is a side view of a helicopter 100 having an airframe including a cockpit 102, a main rotor 112, a tail boom 106, a tail rotor 108 mounted on the tail boom 106, and an engine/transmission 104 for driving the main rotor 112 and the tail rotor 108. The main rotor 112 and the tail rotor 108 may each include a plurality of rotor blades 110.

FIG. 2 is a perspective illustration of an embodiment of a rotor blade 110 of a main rotor of a helicopter 100. The rotor blade 110 may extend from a blade root 114 to a blade tip 116. In addition, the rotor blade 110 may have a trailing edge 120 and a leading edge 118. The leading edge 118 may include an erosion strip 152 configured to protect the rotor blade 110 from impact damage such as from rain, sand, dust, debris, and other objects. The erosion strip 152 may be formed as a metal detail 150 and may be comprised of a metallic material such as nickel, titanium, stainless steel, and/or any other metallic material or alloy.

FIG. 3 is an exploded perspective illustration of the rotor blade 110 of FIG. 2 and showing the metal detail 150 which may be coupled to the leading edge 118 of the rotor blade 110 by an adhesive layer 126 (FIG. 2). The metal detail 150 may be formed as a separate component from the rotor blade 110. In this regard, the rotor blade 110 may be formed of metallic material and/or composite material such as fiber-reinforced polymer matrix material. In an embodiment, the metal detail 150 may be formed by an electro-forming process, by machining, by casting, or by any other manufacturing process for fabricating the metal detail 150 as a separate component from the rotor blade 110. In an embodiment, the metal detail 150 may be non-plated onto the rotor blade, and may be separately formed and then coupled to the rotor blade 110.

Advantageously, the present disclosure includes a deplating process for removing the metal detail 150 from an article 136 such as a rotor blade 110 formed of metallic material, composite material, and/or dielectric material 124. As described in greater detail below, the deplating process may include removing a metallic material from a dielectric material 124 (e.g., an electrically non-conductive material) using electrolysis. Although described in the context of a rotor blade, the deplating process as disclosed herein may be implemented for removing a metal detail 150 of any size, shape and configuration from a dielectric material 124 of any type of article 136 of any size, shape, and configuration, without limitation.

Figure 4:
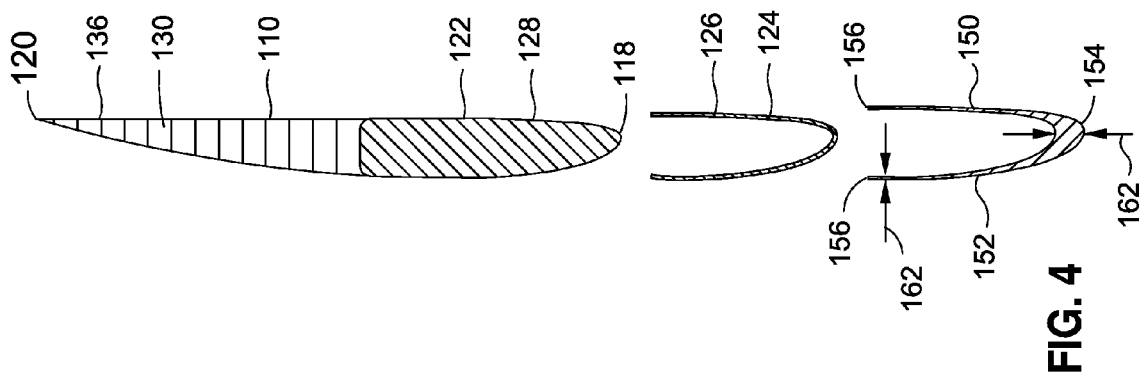
FIG. 4 is a cross-sectional illustration of the main rotor blade taken along line 4 of FIG. 3 and illustrating the metal detail that may be coupled to the main rotor blade using a dielectric material such as epoxy adhesive.

FIG. 4 is an exploded sectional illustration of the rotor blade 110 of FIG. 3. The rotor blade 110 may include a D-spar 122 which may comprise the primary load-carrying structural element of the rotor blade 110. In an embodiment, the D-spar 122 may be formed of composite material such as the above-mentioned fiber-reinforced polymer matrix material. Although the D-spar 122 is shown as having a generally solid cross section, the D-spar 122 may be provided with a hollow cross section (not shown). The rotor blade 110 may further include a honeycomb core 130 bounded by a pair of fiberglass or metallic face sheets (not shown). The honeycomb core 130 and/or the face sheets may be coupled to the D-spar 122 to form the trailing edge 120 section of the rotor blade 110. The metal detail 150 (e.g., erosion strip 152) may be adhesively bonded to the leading edge 118 of the rotor blade 110 at the D-spar 122 such that the D-spar 122 functions as a substrate 128 for the metal detail 150. However, the metal detail 150 may be bonded to any location along the rotor blade 110, and is not limited to bonding at the leading edge 118 such as to the D-spar 122.

Figure 5:
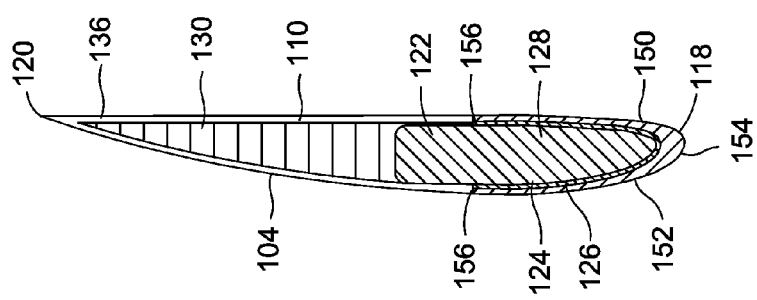
FIG. 5 is a cross-sectional illustration of the main rotor blade showing the metal detail adhesively bonded thereto.

FIG. 5 is a sectional illustration of the assembled rotor blade 110 with the metal detail 150 adhesively bonded to the leading edge 118 using a dielectric material 124 such as an adhesive. In an embodiment, the metal detail 150 may be coupled to the substrate 128 of the rotor blade 110 by means of an adhesive layer 126 comprised of epoxy adhesive. In the present disclosure, a dielectric material 124 may be defined as an electrically non-conductive material, or a material having a relatively low electrical conductivity or a relatively high electrical resistivity. In an embodiment, the dielectric material 124 may include materials having an electrical resistivity of greater than approximately $1 \times 10^{-6}$ Ohm-meter ($\Omega$-m). For example, in an embodiment, the dielectric material as used herein may comprise glass, ceramic, plastic, rubber, and polymeric material, and any material having an electrical resistivity of greater than approximately $1 \times 10^{-6}$ $\Omega$-m.

In FIG. 5, the metal detail 150 may have a constant thickness or a variable thickness. For example, the metal detail 150 may have a greater thickness 162 (FIG. 4) at a nose 154 (FIG. 4) of the metal detail 150 and tapering to a smaller thickness 162 at an aft edge 156 (FIG. 4) of the metal detail 150. In an embodiment, the metal detail 150 may have a thickness 162 of up to approximately 0.15 inch or greater at the nose 154 of the metal detail 150, and a thickness 162 in the range of approximately 0.002 to 0.030 inch at the aft edges 156 of the metal detail 150. In this regard, the deplating process disclosed herein may be effective for removing metal details 150 of any thickness, without limitation. The deplating process may be effective for removing a metal detail 150 having a thickness of 0.002 inch or more. For example, in an embodiment, the deplating process may remove a metal detail 150 having a thickness of 0.010 inch or more.

Advantageously, the deplating process may be effective for removing a metal detail 150 (FIG. 4) having a thickness 162 (FIG. 4) that may be generally greater than the thickness of metal coatings (not shown) applied to (e.g. coated over) a substrate 128 (not shown) using conventional electroplating processes (not shown) wherein such coating thicknesses may be less than approximately 0.002 inch. In addition, the deplating process disclosed herein provides a significant advantage over conventional chemical stripping processes (not shown) for removing conventionally-plated metallic coatings. For example, such conventional chemical stripping processes may include the use of an acid (not shown) for removing metallic coatings of relatively small thickness on the order of approximately 0.001-0.002 inch, and wherein the acid may indiscriminately attack composite material (not shown) and/or metallic material (not shown) that come into contact with the acid.

FIG. 6 is an end view of the rotor blade 110 showing the blade tip having one or more metal components 132 such as inserts 134 installed thereon. As described in greater detail below, the rotor blade 110 may have one or more metal components 132 that may require protection against the plating process to avoid damage. For example, such metal components 132 may be protected by masking or applying other sealing material to prevent deplating (e.g., electro-decomposition) of the metal components 132.

Figure 7:
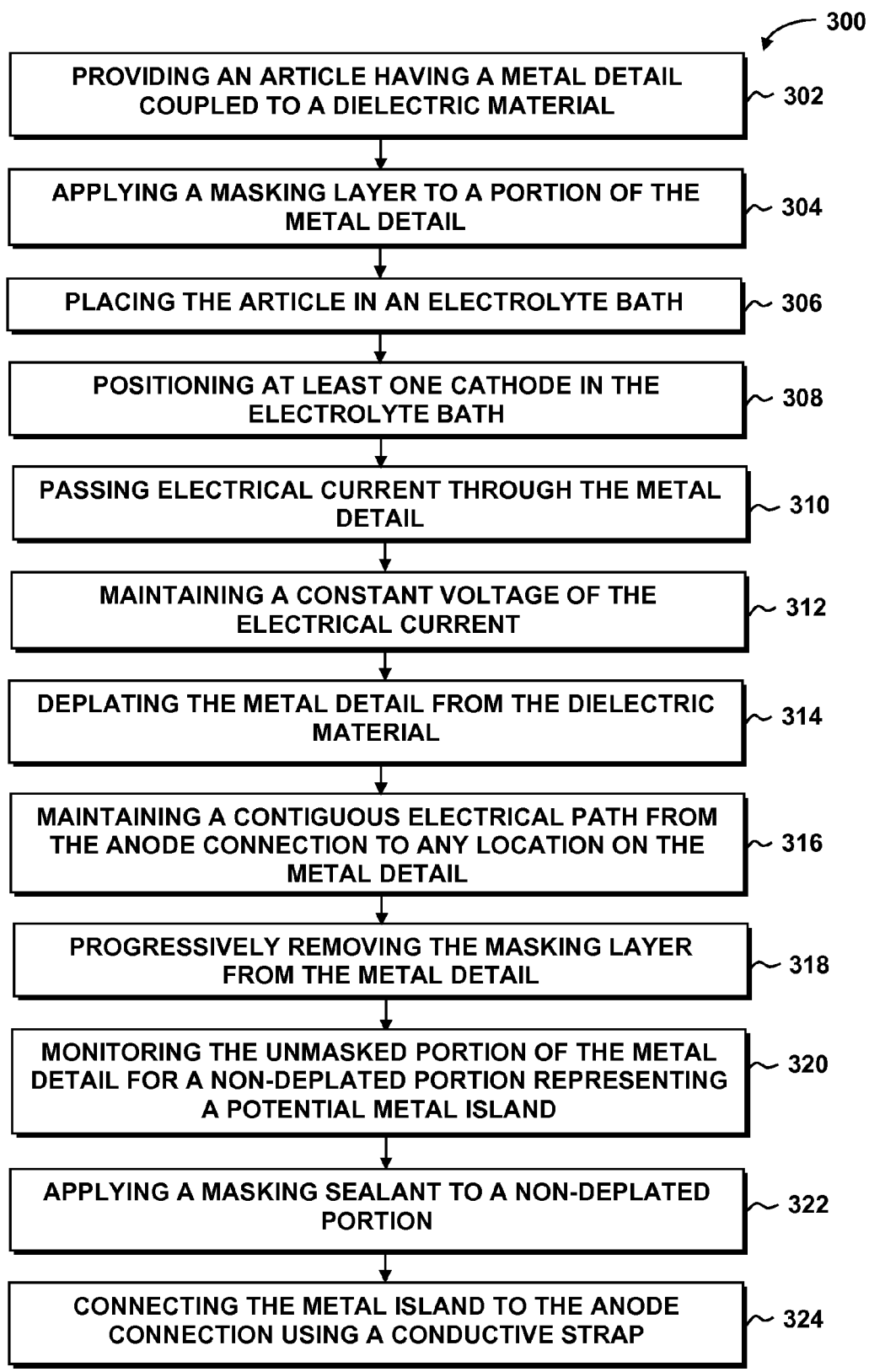
FIG. 7 is an illustration of a flow chart including one or more operations of a method of removing a metal detail from a dielectric material.

FIG. 7 is an illustration of a flow chart including one or more operations that may be included in an embodiment of a method 300 of removing a metal detail 150 (FIG. 4) from a dielectric material 124 (FIG. 4) of an article 136 (FIG. 4). Although the method 300 is described in the context of an article 136 representing a rotor blade 110, the method may be implemented for removing a metal detail 150 of any size, shape and configuration, from a dielectric material 124 of an article 136 of any size, shape, and configuration. In addition, the method 300 is not limited to removing a metal detail 150 from an adhesive layer 126 (FIG. 4), but may include removing a metal detail 150 from a dielectric substrate 128 (FIG. 4) such as a composite article 136. However, the method may also include removing a metal detail 150 from a dielectric adhesive layer 126 coupling the metal detail 150 to a metallic substrate 128.

Referring to FIG. 8, Step 302 of the method 300 (FIG. 7) may include providing an article 136 having a metal detail 150 coupled to or contacting a dielectric material 124. The article 136 shown in FIG. 8 represents a rotor blade 110 for purposes of illustrating the deplating process disclosed herein. The article 136 in FIG. 8 includes the metal detail 150 adhesively coupled to a dielectric adhesive layer 126 which is in turn adhesively coupled to the substrate 128 of the article 136. The substrate 128 comprises the substructure of the article 136 which may be formed of metallic material and/or composite material. The dielectric adhesive layer 126 separates the metal detail 150 from the substrate 128. In addition to the dielectric adhesive layer 126, the substrate 128 may also be formed of a dielectric material 124 to which the metal detail 150 is adhesively coupled. For example, the substrate 128 may be formed of composite material such as fiber-reinforced polymer-matrix material. In an embodiment, the fiber-reinforced polymer matrix material may comprise graphite epoxy material, fiberglass-epoxy material, or any other type of fiber-reinforced composite material.

FIG. 8A is an end view of the article 136 of FIG. 8 showing the metal detail 150 coupled to the leading edge 118 of the article 136. As indicated above, the dielectric material 124 may be comprised of a material having a relatively low electrical conductivity and a relatively high electrical resistivity as defined above. In an embodiment, the dielectric material 124 may comprise polymeric material and may further comprise glass, ceramic, plastic, and other materials having relatively low electrical conductivity. In an embodiment, the polymeric material comprises the above-mentioned epoxy adhesive coupling (e.g., adhesively bonding) the metal detail 150 to a substrate 128.

Referring to FIG. 9, Step 304 of the method 300 (FIG. 7) may comprise applying a masking layer 170 (FIG. 9) to a portion of the metal detail 150 to form a masked portion 174 of the metal detail 150 and an unmasked portion 176 of the metal detail 150. The masking layer 170 may provide a means for controlling the location where the deplating of the metal detail 150 from the dielectric material 124 occurs. As indicated below, the unmasked portion 176 of the metal detail 150 may be exposed to an electrolyte bath 202 during the deplating process causing the unmasked portion 176 to be depleted from the dielectric material 124 when an electrical current 242 (FIG. 10) is passed through the metal detail 150.

Figure 10:
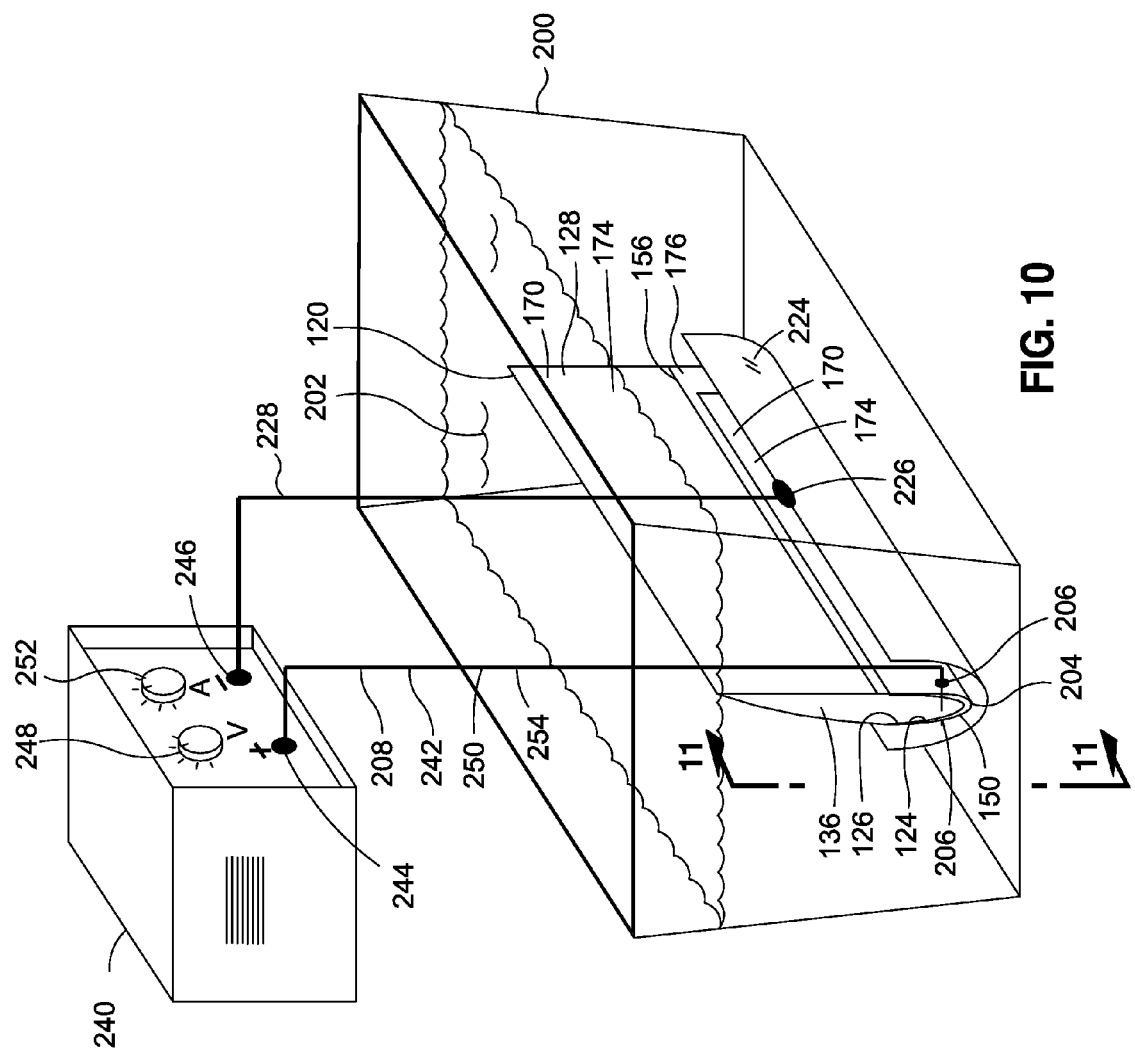
FIG. 10 is a perspective illustration of the article submerged in an electrolyte bath and showing the anode (i.e., the metal detail) being coupled to a positive terminal of a power supply and a cathode coupled to a negative terminal of the power supply.

Step 304 may optionally include applying the masking layer 170 (FIG. 9) over the substrate 128 in a manner preventing contact of the substrate 128 with the electrolyte bath 202 (FIG. 10). In an embodiment, the composite rotor blade 110 (FIG. 6) may include an electrically-conductive mesh (e.g., an aluminum mesh 140—FIG. 6) for charge dissipation in the event of a lightning strike. The masking layer 170 over the substrate 128 may prevent deplating of the aluminum mesh 140 (FIG. 6) during the process of deplating the metal detail 150. In addition, if the polymer fiber reinforced matrix lacks a protective outer layer such as a fiberglass layer, the masking layer 170 may also be applied to the substrate 128 to prevent the absorption of the electrolyte bath 202 into a relatively porous surface of the fiber reinforced polymer matrix material.

FIG. 9A illustrates an anode conducting wire 208 that may be coupled to the metal detail 150 for connecting the metal detail 150 to a power supply 240 (FIG. 10). The anode conducting wire 208 may comprise a wire, cable, or rod. For example, the anode conducting wire 208 may comprise a threaded rod 210 that may be attached to one or both article sides 138 of the article 136 or metal detail 150. For example, the anode conducting wire 208 may comprise a threaded rod 210 passing through the leading edge 118 of the article 136 and secured by a pair of jam nuts 212 against the surfaces of the metal detail 150. However, the anode conducting wire 208 may include one or more wires, rods, or other electrically-conductive elements connecting the metal detail 150 to a power supply 240 (FIG. 10).

In an embodiment, the masking layer 170 (FIG. 9) may be applied to the metal detail 150 (FIG. 9) such that the unmasked portions 176 (FIG. 9) of the metal detail 150 are located furthest from the anode connection 206 (FIG. 9). For example, FIG. 9 illustrates the anode connection 206 being located proximate at a lower left-hand corner of the metal detail 150, and the unmasked portion 176 being located along a right-hand side of the metal detail 150 and along an upper portion of the metal detail 150 adjacent to the aft edges 156 of the metal detail 150 on the opposing article side 138 (FIG. 9A) of the article 136 (FIG. 9A).

The masking layer 170 (FIG. 9) may prevent contact of the electrolyte bath 202 with the masked portion 174 (FIG. 9) of the metal detail 150 (FIG. 9) and thereby prevent deplating of such areas, and instead allowing the deplating to occur at the unmasked portions 176 of the metal detail 150. In this manner, the masking layer 170 may prevent the formation of electrically-isolated metal islands 160 (FIG. 18), and thereby maintain a substantially continuous electrical path along the metal detail 150 during the deplating process, as described in greater detail below. In an embodiment, the masking layer 170 may comprise masking tape having pressure-sensitive adhesive on at least one side thereof. In an embodiment, the masking tape may be commercially available from the 3M Company as 3M™ Electroplating Tape 470, although any suitable masking material may be used for masking of the metal detail 150 and/or the substrate 128 (FIG. 9) to prevent contact with the electrolyte bath 202 (FIG. 10).

FIG. 10 is an illustration of a container 200 of an electrolyte bath 202 and a power supply 240. Step 306 of the method 300 (FIG. 7) may include placing the article 136 in the electrolyte bath 202 such that at least a portion of the article 136 is submerged. The metal detail 150 may function as an anode 204 which may be coupled to a positive terminal 244 of the power supply 240. The metal detail 150 in FIG. 10 may be formed of any material that may be electro-decomposed (i.e., deplated), and may include nickel, steel, stainless steel, titanium, inconel, and any other metallic material or alloy. The electrolyte bath 202 may be comprised of a solution that is complementary to the metallic material to be decomposed or deplated. For example, if the metal detail 150 is formed of a nickel-based alloy, then the electrolyte bath 202 may comprise a nickel sulfamate solution. However, the electrolyte bath 202 may be provided in any type of composition, and may include aqueous solutions with optional additives to promote the electro-decomposition of the metal detail 150 during the deplating process.

Referring still to FIG. 10, the method 300 (FIG. 7) may include Step 308 which may comprise positioning at least one cathode 224 in the electrolyte bath 202. The method may include submerging at least a portion of the cathode 224 in the electrolyte bath 202, and positioning the cathode 224 in spaced relation to the anode 204. The cathode 224 may be coupled to a negative terminal 246 of the power supply 240. In this regard, the power supply 240 may be electrically connected to the anode 204 and to the cathode 224 which comprise the electrodes of an electrical circuit completed by the electrolyte. The power supply 240 may provide electrical current 242 to the anode 204 (i.e., the metal detail 150) for deplating the metal detail 150 from the dielectric material 124 (e.g., the epoxy adhesive). In an embodiment, the cathode 224 may be formed of metallic material that may be substantially similar to the metallic material from which the metal detail 150 is formed. For example, if the metal detail 150 is comprised of a nickel alloy, the cathode 224 may also be formed from a nickel-based alloy, or from an alloy that is complementary to nickel. However, the cathode 224 may be formed of any material for conducting the electrical current 242. The cathode 224 may be positioned in spaced, non-contacting relation to the metal detail 150.

Figure 11:
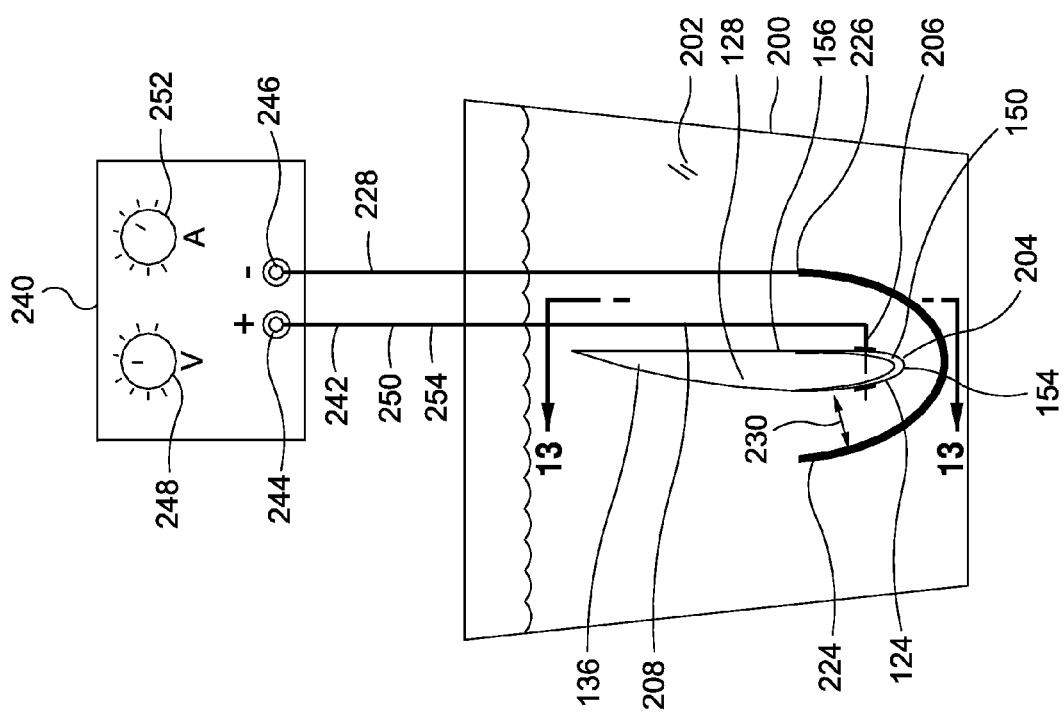
FIG. 11 is an end view of the article submerged in the electrolyte bath and showing an embodiment of the cathode formed as a unitary structure.

In FIG. 11, the cathode 224 may be formed as a unitary structure and may be shaped complementary to the metal detail 150 to promote substantially uniform current density at least locally within the gap between the cathode 224 and the metal detail 150. Such uniform current density may promote a substantially uniform deplating rate, and may avoid the occurrence of metal islands 160 (FIG. 18) during the deplating process, as described in greater detail below. In addition, the unitary cathode 224 may be sized and configured such that the cathode 224 is preferably positioned at a substantially constant distance 230 from the anode 204 at substantially all locations along the cathode 224, to promote uniform deplating along the metal detail 150, and prevent higher rates of deplating at one point along the metal detail 150 relative to other points along the metal detail 150. However, the cathode 224 may comprise a simple rod, cable, or wire that may be at least partially submerged in the electrolyte bath 202, and is not necessarily configured complementary to the size and shape of the metal detail 150.

Figure 12:
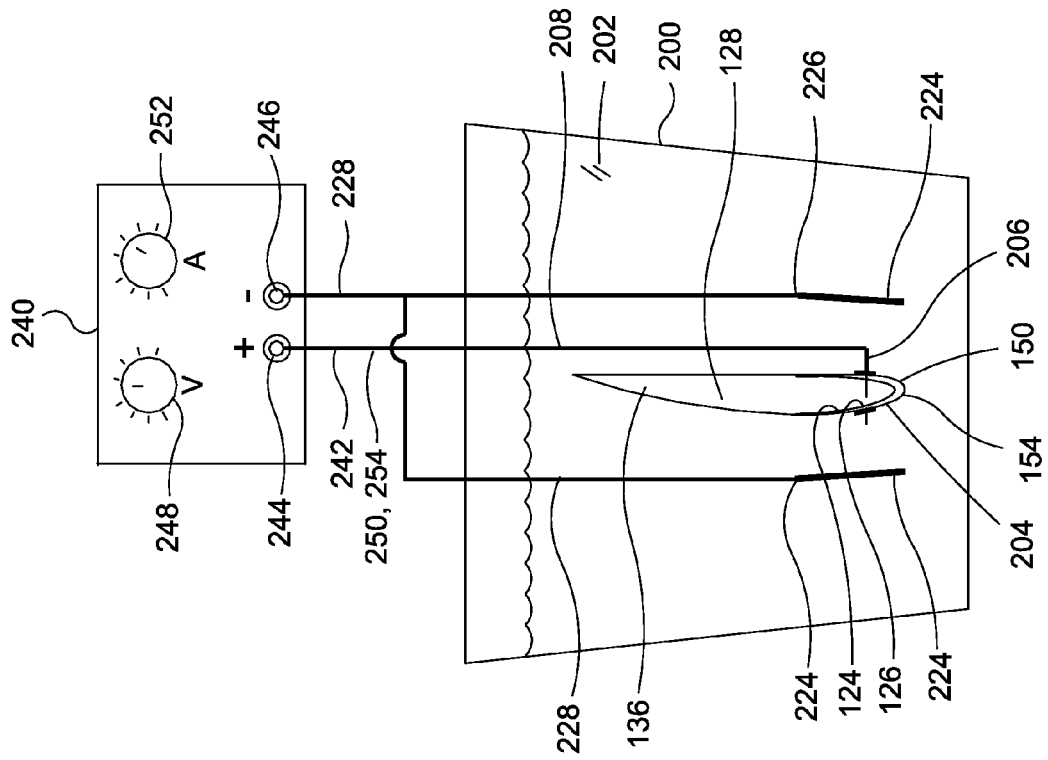
FIG. 12 is an end view of the article submerged in the electrolyte bath and showing a pair of cathodes positioned on opposite sides of the metal detail.

In FIG. 12, shown is an alternative embodiment of the cathode 224 provided as a pair of cathodes 224. The pair of cathodes 224 may be positioned on opposite article side 138 of the article 136. Each one of the cathodes 224 may be electrically connected to the negative terminal 246 of the power supply 240 via the cathode conducting wire 228 that may be coupled to the cathodes 224 at a cathode connection 226. In an embodiment, the cathode(s) 224 may have a total surface area that is at least as large as the surface area of the anode 204 (i.e., the metal detail 150) prior to initiating the deplating operation. The surface area of the cathode 224 may be a factor in the rate at which the metal detail 150 is depleted.

Referring to FIG. 10, Step 310 of the method 300 (FIG. 7) may include passing electrical current 242 through the metal detail 150 to initiate the deplating process. In this regard, the power supply 240 may be activated to apply a positive potential to the anode 204 and a negative potential to the cathode 224. The electrical current 242 may comprise a direct current (i.e., a DC current). The electrical current 242 may be passed through the metal detail 150 upon activation of the power supply 240. In an embodiment, the power supply 240 may comprise a DC power supply (not shown) which may include a rectifier (not shown) to allow for periodically or intermittently reversing current flow (not shown) in relatively short bursts such that a positive potential (not shown) is applied to the cathode 224 and a negative potential is applied to the anode 204 as a means to remove any debris (not shown) or soot from the metal detail 150 and/or to activate the metal detail 150 for the disclosed deplating process wherein positive potential is applied to the anode 204 and negative potential is applied to the cathode 224.

The method 300 (FIG. 7) may include Step 312 which may comprise maintaining a substantially constant voltage 250 (FIG. 10) of the electrical current 242 (FIG. 10), and allowing an amperage 254 (FIG. 10) of the electrical current 242 to float or vary when deplating the metal detail 150 (FIG. 10) from the dielectric material 124 (FIG. 10). Step 312 may include selecting a voltage 250 within a range of from approximately 3-15 volts by adjusting a voltage adjustment 248 dial (FIG. 10) on the power supply 240. In an embodiment, the voltage 250 may be set between approximately 5-9 volts for the deplating process. However, the voltage 250 of the electrical current 242 may be greater than 15 volts. In this regard, it may be desirable to minimize the voltage 250 for safety reasons. The power supply 240 may include an amperage adjustment 252 dial (FIG. 10). However, the amperage range may be allowed to float or vary. In an embodiment, the amperage may fall within the range of approximately 20-32 amps, although an amperage 254 of less than 20 amps or greater than 32 amps may be used. During the deplating process, the amperage 254 may gradually decrease over time as the total area of the metal detail 150 is gradually reduced during the deplating process.

Figure 13:
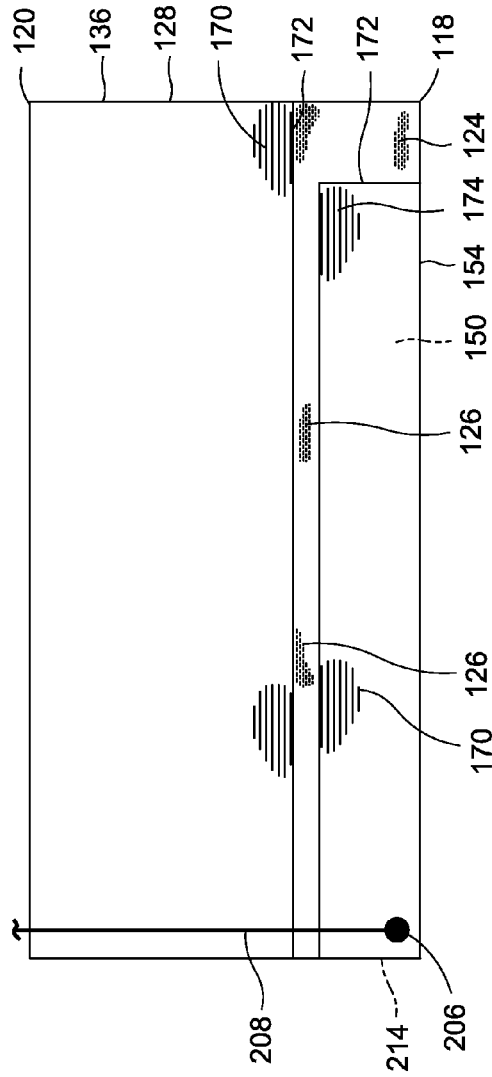
FIG. 13 is a side view of the article following the initial deplating of the unmasked portion of the metal detail in response to passing electrical current through the metal detail.

Referring to FIG. 13, Step 314 of the method 300 (FIG. 7) may include deplating the metal detail 150 from the dielectric material 124 in response to passing the electrical current 242 (FIG. 12) through the metal detail 150. FIG. 13 illustrates the initial deplating of the unmasked portion 176 (FIG. 12) of the metal detail 150, leaving the dielectric adhesive exposed in FIG. 13. During the deplating process, the electrolyte bath 202 (FIG. 12) carries electrical current 242 between the two electrodes comprising the anode 204 (i.e., the metal detail 150) and the cathode 224 (FIG. 11). During the deplating process, the metal detail 150 may be oxidized into metal ions (not shown), resulting in the dissolving of the metal ions into the electrolyte bath 202, and the plating of the cathode 224 with the metal ions.

In FIG. 13, Step 316 of the method 300 (FIG. 7) may include maintaining a contiguous electrical path 214 from the anode connection 206 to any or substantially all locations or substantial portions of the exposed metal detail 150 while deplating the metal detail 150 from the dielectric. By maintaining a contiguous electrical path 214 to the anode connection 206, the formation of metal islands 160 (FIG. 18) may be avoided as described below. In this regard, step 316 may comprise maintaining a contiguous electrical current 242 (FIG. 12) path through the metal detail 150 until a substantial majority of the metal detail 150 is removed from the substrate 128.

Referring briefly to FIG. 10, the method 300 (FIG. 7) may include circulating the electrolyte bath 202 while removing the metal detail 150 from the dielectric material 124. Circulation of the electrolyte bath 202 may maintain a substantially uniform current density within the electrolyte bath 202 at least locally at an interface between the electrolyte bath 202 and the metal detail 150. A substantially uniform current density may promote substantially uniform deplating across metal detail 150. In this regard, the uniform current density may be promoted by stirring or agitating the electrolyte bath 202 such as with a mechanical device (not shown) such as a rotating blade, a pump, or a circulation fan positioned within the electrolyte bath 202, or other means for stirring or agitating the electrolyte bath 202.

Figure 14:
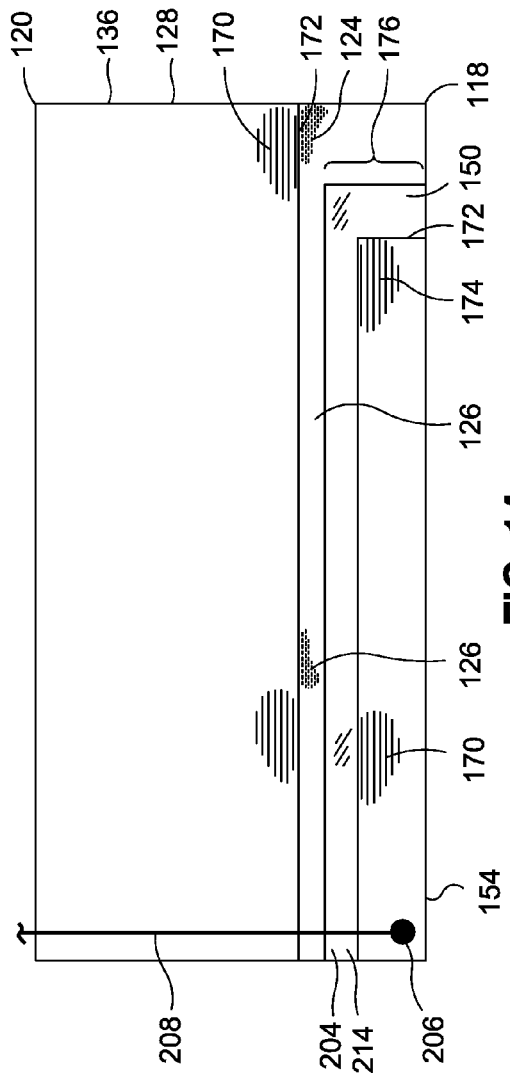
FIG. 14 is a side view of the article illustrating the masking portion after being trimmed back to form a new unmasked portion of the metal detail for deplating.
Figure 15:
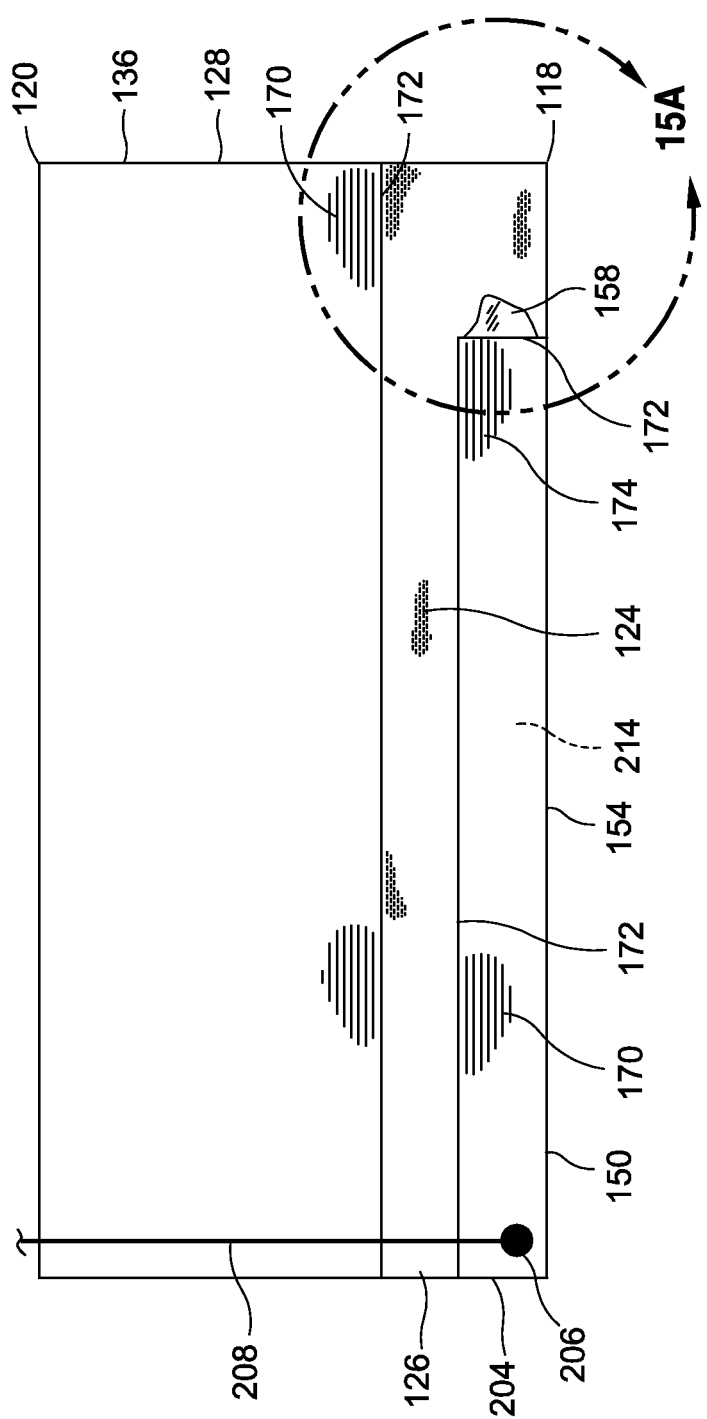
FIG. 15 is a side view of the article illustrating the formation of a potential metal island along a masking edge of the masked portion of the metal detail.

In FIG. 15, Step 318 of the method 300 (FIG. 7) may include progressively removing the masking layer 170 from the metal detail 150 during the deplating process. The progressive removal of the masking layer 170 from the metal detail 150 may progressively reduce the size of the masked portion 174 and progressively expose additional areas of the metal detail 150 to the electrolyte bath 202 (FIG. 12) during the deplating process. In an embodiment, Step 318 may include trimming the masking edge 172 such as with a cutting tool. For example, the masking layer 170 may be trimmed using a razor blade to form a new unmasked portion 176 (FIG. 14) of the metal detail 150.

Figure 15A:
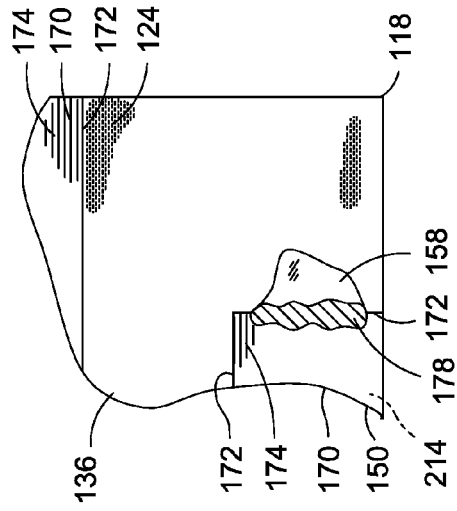
FIG. 15A is an enlarged view of the portion of the article showing the potential metal island forming along the masking edge.

In FIG. 15A, shown is a non-deplated portion 158 of the metal detail 150 that may occur during the deplating process. In this regard, the method 300 (FIG. 7) may include Step 320 of monitoring (e.g., visually) the unmasked portion 176 (FIG. 14) of the metal detail 150 such as along a masking edge 172 for such non-deplated portions 158. Each one of the non-deplated portions 158 may represent an undesirable metal island 160 (FIG. 18) that may form and may remain permanently bonded to the dielectric material 124. A metal island 160 may comprise a region of the metal detail 150 that may become electrically isolated from the anode connection 206 (FIG. 15) such that no electrical current 242 (FIG. 12) will reach the metal island 160. Such metal islands 160 may form in response to the electrolyte bath 202 (FIG. 12) seeping underneath the masking layer 170 and causing localized deplating of the metal detail 150.

Figure 15B:
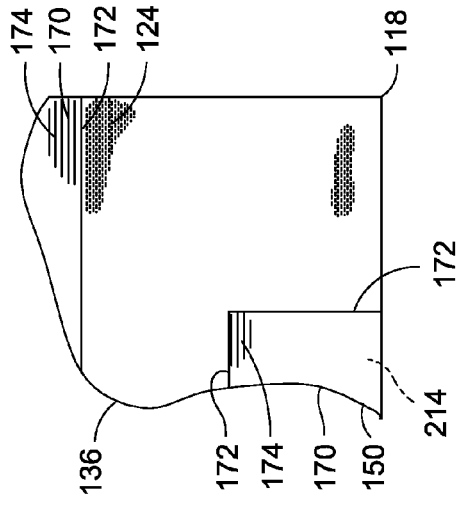
FIG. 15B illustrates the application of an electrically non-conductive sealant along the masking edge at the location of the potential metal island.

In FIG. 15B, Step 322 of the method 300 (FIG. 7) may include applying an electrically non-conductive masking sealant 178 along a masking edge 172 at the location of a non-deplated portion 158. The masking sealant 178 may be applied to at least partially overlap the masking edge 172 and the non-deplated portion 158 to prevent or preempt the formation of a metal island 160 (FIG. 18). In an embodiment, the masking sealant 178 may comprise a liquid or a paste that may subsequently harden and prevent contact of the electrolyte bath 202 (FIG. 12) with the sealant-covered portion of the non-deplated portion 158. In an embodiment, the masking sealant 178 may comprise Miccro Super XP-2000 Stop-Off Lacquer™ commercially available from Allied Plating Supplies, Inc., or any other suitable sealant material for masking a desired region of a non-deplated portion and preventing the occurrence of a metal island 160.

Figure 15C:
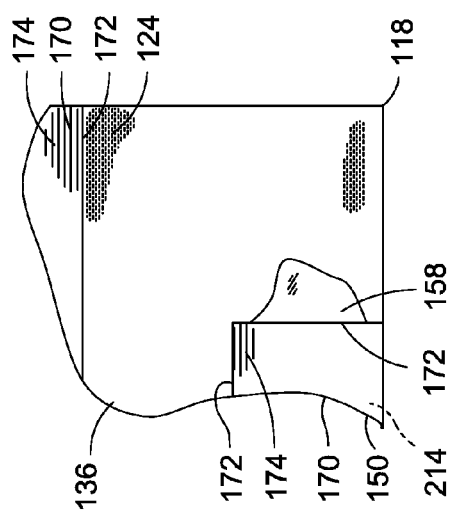
FIG. 15C illustrates the reduction in the size of the potential metal island after resumption of the passing of electrical current through the metal detail following the application of the sealant along the masking edge.

In FIG. 15C, the method 300 (FIG. 7) may include resuming the passing of the electrical current 242 through the metal detail 150 following application of the masking sealant 178 (FIG. 15C) to the non-deplated portion 158 (FIG. 15B). The resumption of the application of the electrical current 242 may continue the deplating process.

Figure 15D:
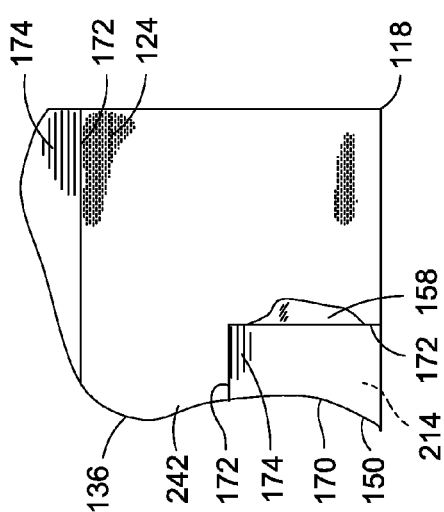
FIG. 15D illustrates the elimination of the potential metal island by deplating as result of the application of sealant along the masking edge.

In FIG. 15D, shown is the article 136 and the elimination of the non-deplated portion 158 from the dielectric material 124 after the removal of the masking sealant 178. Advantageously, the masking sealant 178 may prevent the formation of a metal island 160 (FIG. 18). As indicated above, a metal island 160 may be electrically non-contiguous with the remainder of the metal detail 150, and resulting in electrical current 242 not passing into the metal island 160 for deplating.

FIG. 16 illustrates the additional trimming of the masked portion 174 to form a new unmasked portion 176 of the metal detail 150. In an embodiment, the article 136 may be temporarily removed from the electrolyte bath 202 (FIG. 12) to allow for trimming of the masked portion 174. As indicated above, the metal detail 150 is progressively exposed by trimming the masked portion 174 in a manner such that a contiguous electrical path 214 remains between the anode connection 206 and the remaining portions of the metal detail 150.

FIG. 17 illustrates the deplating of the unmasked portion 176 of the metal detail 150 of FIG. 16, and the removal of the final masked portion 174. Although the figures illustrate only one side of the article 136, the progressive trimming of the masked portion 174 may be performed in a substantially equivalent manner on both of the opposing article sides 138. In this manner, the metal detail 150 may be de-plated in a substantially uniform manner on both of the article sides 138.

FIG. 18 is a side view of the article 136 illustrating a metal island 160 remaining on the dielectric material 124 of the article 136 after removal of the metal detail 150 from the dielectric material 124. As indicated above, such a metal island 160 may occur in response to the electrolyte bath 202 (FIG. 12) seeping underneath the masking layer 170 and causing localized deplating of the metal detail 150.

FIG. 19 illustrates Step 324 of the method 300 (FIG. 7) which may include using a conductive strap 216 to connect the metal island 160 to the anode connection 206. After connecting the metal island 160 to the anode connection 206, the method may include activating the power supply 240 (FIG.

12) and passing electrical current 242 (FIG. 12) through the conductive strap 216. The method may further include deplating the metal island 160 from the dielectric material 124. The conductive strap 216 may be formed of any suitable electrically conductive material including, but not limited to, copper, aluminum, or any other conductive material. In an embodiment, the conductive strap 216 may be covered with a masking layer 170 or other insulative material to avoid deplating of the conductive strap 216.

Figure 20:
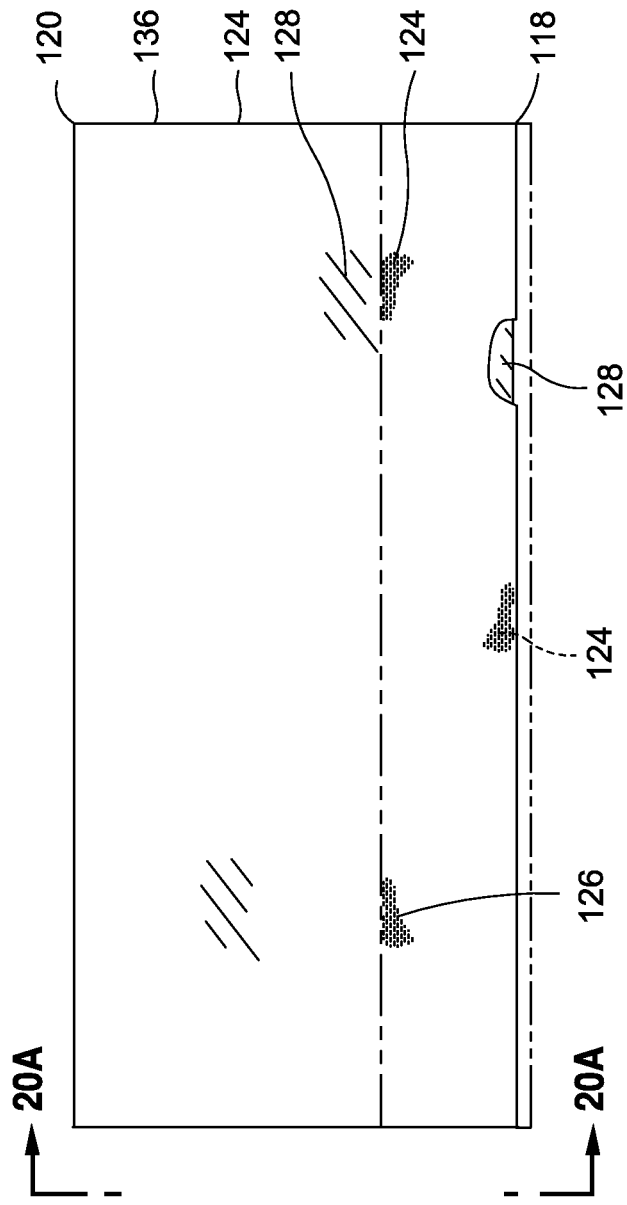
FIG. 20 is a side view of the article after removal of the metal detail using the deplating process.
Figure 20A:
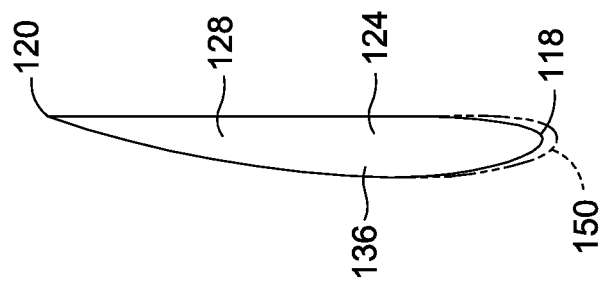
FIG. 20A is an end view of the article illustrating the removal of the metal detail.

FIG. 20 illustrates the article 136 after removal of the metal detail 150 and any metal islands 160 (FIG. 19) using the above-described deplating process. The dielectric material 124, formerly covered by the metal detail 150, is shown in FIG. 20. The masking layer 170 (FIG. 19) covering the substrate 128 may also be removed. FIG. 20A illustrates an end view of the de-plated article 136, and showing the outline of the de-plated metal detail 150 in phantom lines.

As indicated above, the deplating process may be advantageously implemented for removing a worn erosion strip 152 (FIG. 5) from a rotor blade 110 or a propeller (not shown). In an embodiment, a new metallic erosion strip 152 may be adhesively bonding to the rotor blade 110 (FIG. 5) or propeller (not shown) using a dielectric adhesive layer 126 or other suitable attachment means. As indicated above, the above described plating process may be implemented for removing a metal detail 150 (FIG. 5) from any dielectric material 124 (FIG. 5), without limitation, and is not limited to removing a metallic erosion strip 152 from a rotor blade 110 or a propeller.

Figure 21:
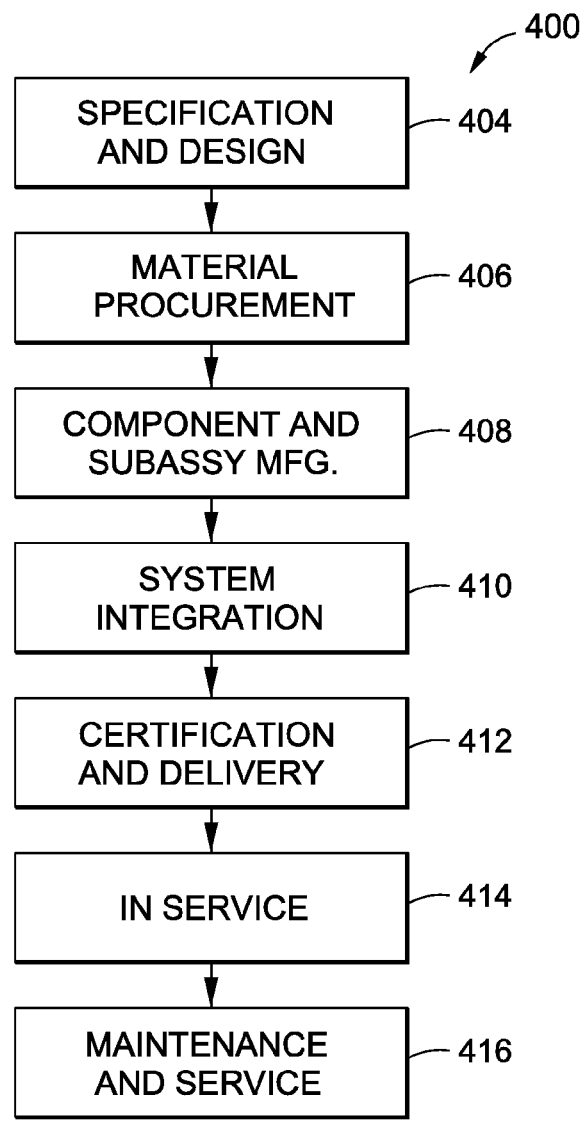
FIG. 21 is an illustration of a flow chart of an aircraft service and production methodology.
Figure 22:
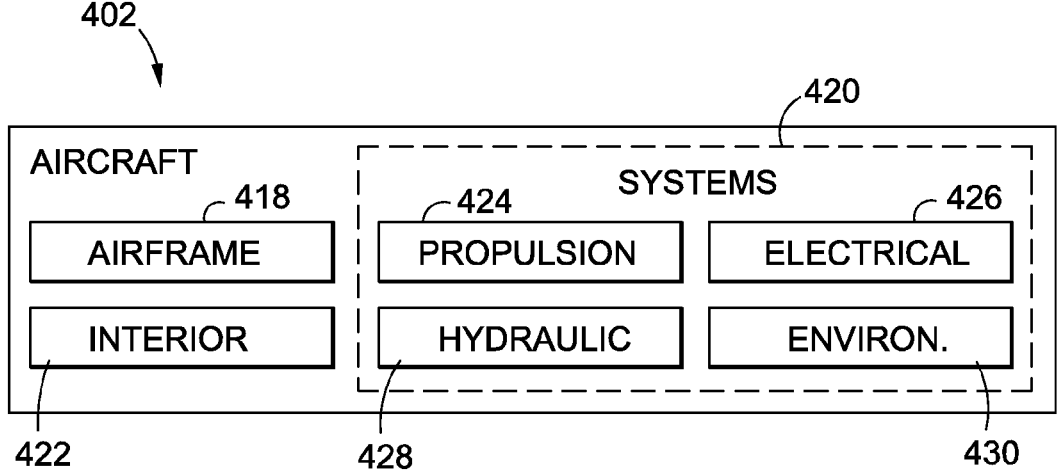
FIG. 22 is an illustration of a block diagram of an aircraft.

Referring to FIGS. 21-22, embodiments of the disclosure may be described in the context of an aircraft manufacturing and service method 400 as shown in FIG. 21 and an aircraft 402 as shown in FIG. 22. During pre-production, exemplary method 400 may include specification and design 404 of the aircraft 402 and material procurement 406. During production, component and subassembly manufacturing 408 and system integration 410 of the aircraft 402 takes place.

In FIG. 21, component subassembly and manufacturing of the aircraft may incorporate the method 300 (FIG. 7) disclosed herein for removing a metal detail 150 (FIG. 4) from a dielectric material 124 (FIG. 4) of an article 136 (FIG. 4). For example, the method 300 may be implemented for removing a metal detail 150 such as an erosion strip 152 that may be adhesively bonded via a dielectric 124 (FIG. 4) adhesive layer 126 to a leading edge 118 (FIG. 2) of a main rotor blade 112 (FIG. 2) of a helicopter 100 (FIG. 1). However, the method 300 may be implemented for removing a metal detail 150 from any structure including an aircraft 402 (FIG. 22) structure. For example, the method 300 (FIG. 7) may include removing a metal detail 150 from a dielectric material 124 (FIG. 3) of an airframe 418 (FIG. 22) of an aircraft 402 (FIG. 22). As indicated above, the dielectric material 124 may be a substrate 128 (FIG. 3) to which the metal detail 150 (FIG. 3) may be coupled. The substrate 128 may be formed of composite material (not shown) such as fiber-reinforced polymer-matrix material including, but not limited to, graphite-epoxy material, fiberglass-epoxy material, or any other type of fiber-reinforced composite material.

In FIG. 21, following production 408 and system integration 410, the aircraft 402 may go through certification and delivery 412. Following certification and delivery 412, the aircraft 402 may be placed in service 414. While in service by a customer, the aircraft 402 is scheduled for routine maintenance and service 416. The routine maintenance and service 416 of the aircraft 402 may include modification, reconfiguration, refurbishment, and so on.

Advantageously during maintenance and service 416, the method 300 (FIG. 7) disclosed herein may be implemented for removing a metal detail 150 such as the above-mentioned erosion strip 152 from a leading edge 118 (FIG. 2) of a main rotor blade 112 (FIG. 2) of a helicopter 100 (FIG. 1) or other aircraft 402 (FIG. 22). For example, the method 300 may be implemented for periodically removing a metal erosion strip 152 from a rotor blade 112. Following removal of the metal erosion strip 152 from the rotor blade 112, a new erosion strip 152 may be installed. The method 300 may be implemented in a similar manner during maintenance and service 416 of an aircraft 402 (FIG. 22) structure such as a fixed-wing aircraft (not shown). For example, the method 300 may be implemented for removing a metal detail 150 (FIG. 6) from a leading edge (not shown) of an airframe 418 such as an aircraft 402 wing (not shown), a control surface (not shown), a tail surface (not shown), a fuselage (not shown), or any one of a variety of other aircraft 402 structures or airframe 418 components, without limitation.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 22, the aircraft 402 produced by exemplary method 400 may include an airframe 418 with a plurality of systems 420 and an interior 422. The airframe 418 may include an airframe 418 of a rotary-wing aircraft (not shown), a fixed-wing aircraft (not shown), or other aircraft configurations. The airframe 418 may include one or more components where the removal of a metal detail 150 (FIG. 6) from a dielectric material 124 (FIG. 6) may advantageously be performed using the method 300 (FIG. 7) disclosed herein. Examples of high-level systems 420 of the airframe 418 include one or more of a propulsion system 424, an electrical system 426, a hydraulic system 428, and an environmental system 430. Any number of other systems may be included. Although an aerospace example is shown, the principles of the invention may be applied to other industries, such as the automotive industry, or any other industry.

Apparatus and methods embodied herein may be employed during any one or more of the stages of the production and service method 400. For example, components or subassemblies corresponding to production process 408 may be fabricated or manufactured in a manner similar to components or subassemblies produced while the aircraft 402 is in service. Also, one or more apparatus embodiments, method embodiments, or a combination thereof may be utilized during the production stages 408 and 410, for example, by substantially expediting assembly of or reducing the cost of an aircraft 402. Similarly, one or more of apparatus embodiments, method embodiments, or a combination thereof may be utilized while the aircraft 402 is in service, for example and without limitation, to maintenance and service 416.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A method of removing a metal detail from a dielectric material of an article, comprising the steps of:
    applying a masking layer to a portion of a metal detail of an article to form a masked portion and an unmasked portion of the metal detail;
    placing the article in an electrolyte bath such that at least a part of the unmasked portion is exposed to the electrolyte bath, the metal detail being coupled to a dielectric material;
    placing an anode conducting wire in direct physical contact with the metal detail in the masked portion;
    positioning at least one cathode in the electrolyte bath in spaced relation to the metal detail;
    passing electrical current through the metal detail; and
    deplating the unmasked portion from the dielectric material in response to passing the electrical current through the metal detail.

2. The method of claim 1, further including:
    progressively removing the masking layer from the metal detail during the deplating thereof.

3. The method of claim 1, further comprising:
    monitoring a masking edge for a non-deplated portion of the metal detail representing a potential metal island wherein the metal detail may become electrically disconnected to an anode connection;
    applying a masking sealant along the masking edge such that the masking sealant at least partially overlaps the non-deplated portion; and
    resuming the passing of the electrical current through the metal detail following application of the masking sealant.

4. The method of claim 1, further comprising:
    connecting a metal island to an anode connection using a conductive strap;
    passing electrical current through the conductive strap and into the metal island; and
    deplating the metal island from the dielectric material.

5. The method of claim 1, wherein:
    the dielectric material comprises at least one of the following: glass, ceramic, plastic, polymeric material.

6. The method of claim 5, wherein:
    the polymeric material comprises an adhesive coupling the metal detail to a substrate.

7. The method of claim 6, wherein:
    the substrate is formed from at least one of metallic material and composite material.

8. The method of claim 7, wherein:
    the composite material comprises fiber-reinforced polymer-matrix material.

9. The method of claim 1, wherein:
    the metal detail has a thickness of at least approximately 0.002 inch.

10. The method of claim 1, further comprising:
    applying a masking layer over a substrate of the article in a manner preventing contact of the substrate with the electrolyte bath.

11. The method of claim 1, wherein the step of positioning at least one cathode in the electrolyte bath comprises:
    submerging at least a portion of the cathode in the electrolyte bath.

12. The method of claim 1, wherein:
    the cathode is shaped complementary to the metal detail.

13. The method of claim 1, wherein:
    the at least one cathode comprises a pair of cathodes positioned on opposite sides of the article.

14. The method of claim 1, wherein:
    the electrical current comprises a direct current.

15. The method of claim 1, wherein the step of passing an electrical current through the metal detail includes:
    maintaining a constant voltage of the electrical current; and
    allowing an amperage of the electrical current to vary when deplating the metal detail.

16. A method of removing a metal detail from a dielectric material of an article, comprising the steps of:
    providing an article having a metal detail coupled to a dielectric material;
    applying a masking layer to a portion of the metal detail to form a masked portion and an unmasked portion;
    placing the article in an electrolyte bath such that at least a part of the unmasked portion is exposed to the electrolyte bath;
    placing an anode conducting wire in direct physical contact with the metal detail in the masked portion;
    positioning at least one cathode in the electrolyte bath in spaced relation to the metal detail;
    passing electrical current through the metal detail; and
    deplating the unmasked portion in response to passing electrical current through the metal detail.

17. The method of claim 16, further including:
    progressively removing the masking layer from the metal detail during the deplating thereof.

18. The method of claim 16, further comprising the step of:
    maintaining a contiguous electrical path between an anode connection and a substantial portion of the metal detail until the metal detail is removed from the dielectric material.

19. A method of removing an erosion strip, comprising the steps of:
    applying a masking layer to a portion of an erosion strip of at least one of a rotor blade and a propeller to form a masked portion and an unmasked portion, the erosion strip being formed of metallic material and being coupled to the rotor blade or the propeller by a dielectric adhesive layer;
    placing the at least one of the rotor blade and the propeller in an electrolyte bath such that the erosion strip is at least partially submerged;
    placing an anode conducting wire in direct physical contact with the erosion strip in the masked portion;
    submersing a cathode in the electrolyte bath in spaced relation to the erosion strip;
    applying an electrical current to the erosion strip; and
    deplating the erosion strip from the adhesive layer in response to applying the electrical current to the erosion strip.

* * * * *